Oct. 7, 1952 P. E. HAWKINSON 2,612,930
TIRE REPAIR PLUG
Filed March 15, 1950
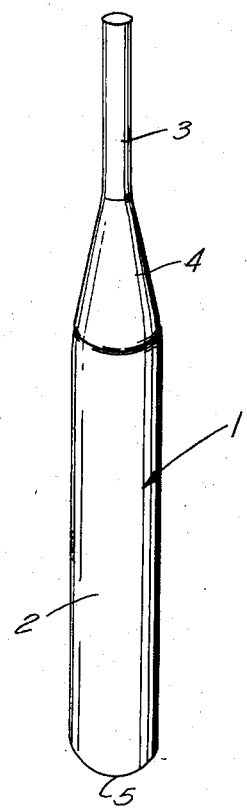
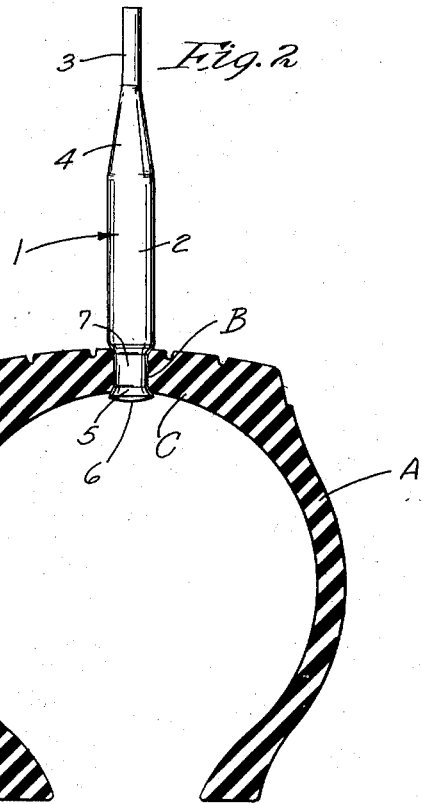
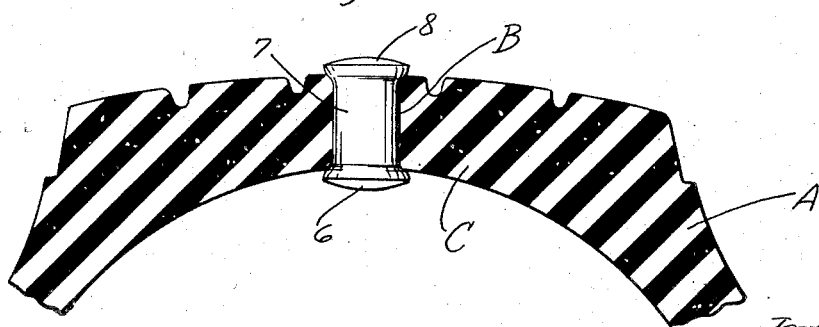
Inventor
Paul E. Hawkinson
By his Attorneys
Merchant & Merchant Patented Oct. 7, 1952

2,612,930

UNITED STATES PATENT OFFICE 2,612,930

TIRE REPAIR PLUG

Paul E. Hawkinson, Minneapolis, Minn., assignor to Paul E. Hawkinson Company, Minneapolis, Minn., a corporation of Minnesota Application March 15, 1950, Serial No. 149,660

1 Claim. (Cl. 152—370)

My invention relates to a novel tire repair plug and provides such a plug which may be utilized in the making of two or more independent repairs of a pneumatic tire carcass.

The primary object of my invention is the provision of a novel tire repair plug which may be utilized to repair substantially circular and relatively small breaks in pneumatic tire casings without vulcanization of the new material to the old.

A still further object of my invention is the provision of a repair plug which has a normal diameter considerably greater than the hole in the tire casing into which it is to be inserted but which, by virtue of its novel design, may be readily reduced in diameter during the process of inserting the same into the opening in the casing, whereby the inserted portion of the plug will exert a radially outward or expansive force against the side walls of the opening through the tire casing.

A still further object of my invention is the provision of a novel repair plug having a circular body formed from rubber-like material, which has an enlarged end of constant diameter which extends for the greater part of the length of the body and which is of a length more than twice the thickness of a tire carcass, whereby said enlarged end may be utilized for the repairing of more than one hole or opening through a tire carcass.

The above and still further objects and advantages of my invention will become apparent from the following detailed specification, appended claim, and attached drawings.

Referring to the drawings, wherein like characters indicate like parts throughout the several views:

Fig. 1 is a perspective view of my novel tire repair plug;

Fig. 2 is a view, partly in vertical section and partly in side elevation, showing my novel repair plug inserted through an opening in the side wall of the tire casing; and Fig. 3 is an enlarged fragmentary view corresponding to Fig. 2 but showing the completed repair after the unused portion of the plug has been cut away.

Referring with greater particularity to the drawings, the numeral 1 indicates, in its entirety, the cross-sectional circular body of my novel repair plug. The letter A indicates a tire carcass having an opening B extending transversely through the wall C thereof.

As shown, the body 1 of the repair plug has an enlarged end 2 of constant diameter, a reduced end portion 3 also preferably of constant diameter, and a tapered interconnecting portion 4. It will be observed that the enlarged end portion 2 is of a length at least double that of the reduced end portion 3. Also, it will be observed that the length of the enlarged end portion 2 is more than twice the thickness of the wall C of the carcass A.

While the particular tool or tools utilized by me in the positioning of the plug, as shown in Fig. 2, and the method of repairing a hole in a pneumatic tire casing with my novel plug, are the subject matter of separate copending United States patent applications, filed by me and entitled respectively "Tire Repairing Tool" Serial No. 149,659, filed March 15, 1950, now abandoned, and "Method of Repairing Pneumatic Tire Casings" Serial No. 150,124, filed March 17, 1950, now abandoned, nevertheless, I believe that it is necessary to roughly describe said tool or tools and said process, herein.

At the outset, it should be understood that my novel plug is adaptable for repair only of nail holes or small circular breaks in tire carcasses which have a maximum initial diameter of less than one-half an inch. This opening or break is first reamed out or enlarged by a tapered rotary rasp to a maximum diameter not materially in excess of one-half an inch, as shown by the letter B in Figs. 2 and 3. This reaming out of the hole is important not only in that it facilitates insertion of the enlarged end 2 of the plug 1 but also in that it removes from immediately adjacent the hole or break, that portion of the carcass which has been weakened by moisture or the like entering said hole.

After the hole or break has been enlarged to a diameter as indicated by the letter B, the hole B is thoroughly saturated and lubricated with liquid rubber cement. Thereafter, and while the cement is still in fluid form, the reduced end 3 of the plug 1 is inserted through the opening B from the inside of the casing or carcass, and the extreme outer end is clasped by a pair of pliers or the like. By applying force axially of the plug 1, the entire plug is extended longitudinally sufficiently to reduce the diameter thereof to a point where the enlarged end 2 is in the position of Fig. 2. Preferably to limit the longitudinal movement of the enlarged end 2 of the plug 1 to the position of Fig. 2, or in other words to prevent the plug 1 from being pulled completely through the opening or hole B, I utilize a novel tool such as identified in my copending patent application above referred to and entitled "Tire Repairing Tool." Obviously, in the inserting of the enlarged end 2 of the plug 1 into the hole B, which has a diameter much less than the normal diameter of said enlarged end 2, the tapered portion 4 plays a very important part.

It will be noted that, by pulling all of the enlarged end 2 of the plug 1 through the hole B with the exception of the free end 5 thereof, a head 6 will be formed on the inside of the casing A. Head 6 is enlarged with respect to the reduced portion 7 within the hole B. This head 6 is important in that it tends to prevent the reduced portion 7 from being forced radially outwardly of the tire casing by action of the air pressure therewithin, after inflation. Furthermore, it is preferably important to cut off the enlarged end 2 of the plug 1 in spaced relation to the outer surface of the tire casing so as to form an enlarged head 8 on the outside of the tire casing A. Head 8 likewise tends to prevent the reduced portion 7 from being forced radially inwardly of the casing A by virtue of pressure exerted from without.

I have found that the constant radial pressure exerted by the reduced portion 7 of the plug 1 against the side walls of the hole B, the rubber cement between the reduced portion 7 and the walls of the hole B, and the enlarged heads 6 and 8, cooperate to produce a plug which is not only adequately secured within the hole B but one which will adequately prevent the entrance of moisture within the hole B.

As above indicated, an important object of my novel plug is that, when one plug, such as illustrated in Fig. 3, is formed therewith, one or more plugs of identical size and shape may be formed by the unused portion of the enlarged end 2—in a manner identical to that above-described.

Insofar as the portion 3 is concerned, it is necessary that the same be of a diameter considerably less than the opening B and of a length greater than the thickness of the carcass A so that it may be inserted completely through the opening B. It is essential that the diameter of the portion 3 be substantially uniform in order that said portion have no weak spots therein for, in some instances, considerable force is exerted through this portion in the inserting of the plug 1 to the positions of Figs. 2 and 3.

My novel plug and its method of use have been completely tested and found to be entirely satisfactory for the accomplishment of the above objectives; and, while I have illustrated a commercial form of my invention, it should be clear that my invention is capable of modification within the scope and spirit of the invention as defined by the appended claim.

What I claim is:

A rubber-like repair plug for a pneumatic tire casing, comprising a unitary elongated body of circular cross section throughout its length, the body including an elongated plug forming cylindrical portion of uniform cross section throughout its length and having a free end, the said body further including a portion co-axial with the cylindrical portion and which tapers away from the other end thereof, and a second cylindrical portion of substantially less diameter than the first cylindrical portion extending axially from the smaller end of the tapered portion, the said first cylindrical portion being of a length greater than twice the thickness of the casing wall to be repaired, whereby a plurality of plugs may be formed from a single repair plug.

PAUL E. HAWKINSON.

REFERENCES CITED

The following references are of record in the file of this patent:

UNITED STATES PATENTS

| Number | Name | Date |
|---|---|---|
| 638,389 | Hannis | Dec. 5, 1899 |
| 734,108 | Tingley | July 21, 1903 |
| 931,056 | Glanz | Aug. 17, 1909 |
| 1,188,998 | Rood | June 27, 1916 |
| 1,453,485 | Vosburgh | May 1, 1923 |
| 1,831,000 | Hawkinson | Nov. 10, 1931 |
| 2,230,660 | Wedler | Feb. 4, 1941 |
| 2,293,374 | Wessler | Aug. 18, 1942 |